United States Patent [19]

Yigdall et al.

[11] 4,204,856
[45] May 27, 1980

[54] EDGE STRETCHING APPARATUS INCLUDING INSULATED SEAL

[75] Inventors: Jeffrey S. Yigdall, Carlisle, Pa.; James A. Zahler, Burkburnett, Tex.

[73] Assignee: PPG Industries, Inc., Pittsburgh, Pa.

[21] Appl. No.: 933,238

[22] Filed: Aug. 14, 1978

[51] Int. Cl.² .............................................. C03B 18/02
[52] U.S. Cl. .................... 65/157; 65/182 R; 65/199; 65/253; 65/347; 266/271; 432/244
[58] Field of Search ............. 65/99 A, 157, 182 R, 65/199, 253, 374 RM, 347; 266/271, 273; 432/236, 244, 246

[56] References Cited

U.S. PATENT DOCUMENTS

| 3,223,503 | 12/1965 | Barradell-Smith et al. | 65/99 A |
|---|---|---|---|
| 3,266,880 | 8/1966 | Pilkington | 66/99 A |
| 3,649,237 | 3/1972 | Classen et al. | 65/99 A X |
| 3,653,868 | 4/1972 | Swillinger | 65/182 R |
| 3,653,869 | 4/1972 | Biagini | 65/99 A X |
| 3,805,072 | 8/1974 | Goerens et al. | 65/99 A X |

OTHER PUBLICATIONS

Refrasil, High Temperature Insulation, Arrnco. Steel Corp., 4/8/76, 9 pp.

*Primary Examiner*—Arthur D. Kellogg
*Attorney, Agent, or Firm*—Dennis G. Millman; Paul A. Leipold

[57] ABSTRACT

An apparatus for sealing between edge control machines and forming chamber sidewalls is disclosed. The invention comprises collar means mounted surrounding the barrel of the edge control machine, alignment means fastened to the edge control machine for maintaining the collar aligned with the barrel of the edge control machine, and a flexible sleeve between the collar and the forming chamber sidewall.

16 Claims, 5 Drawing Figures

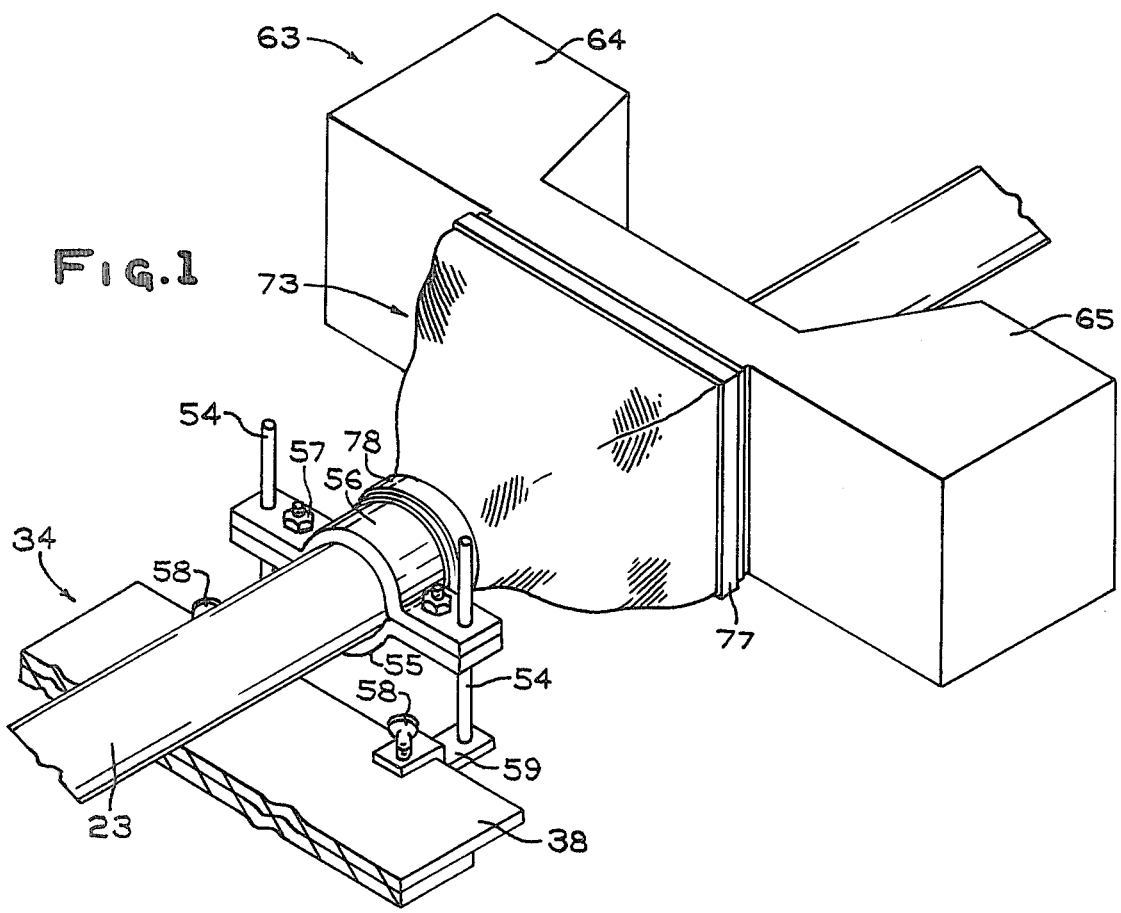
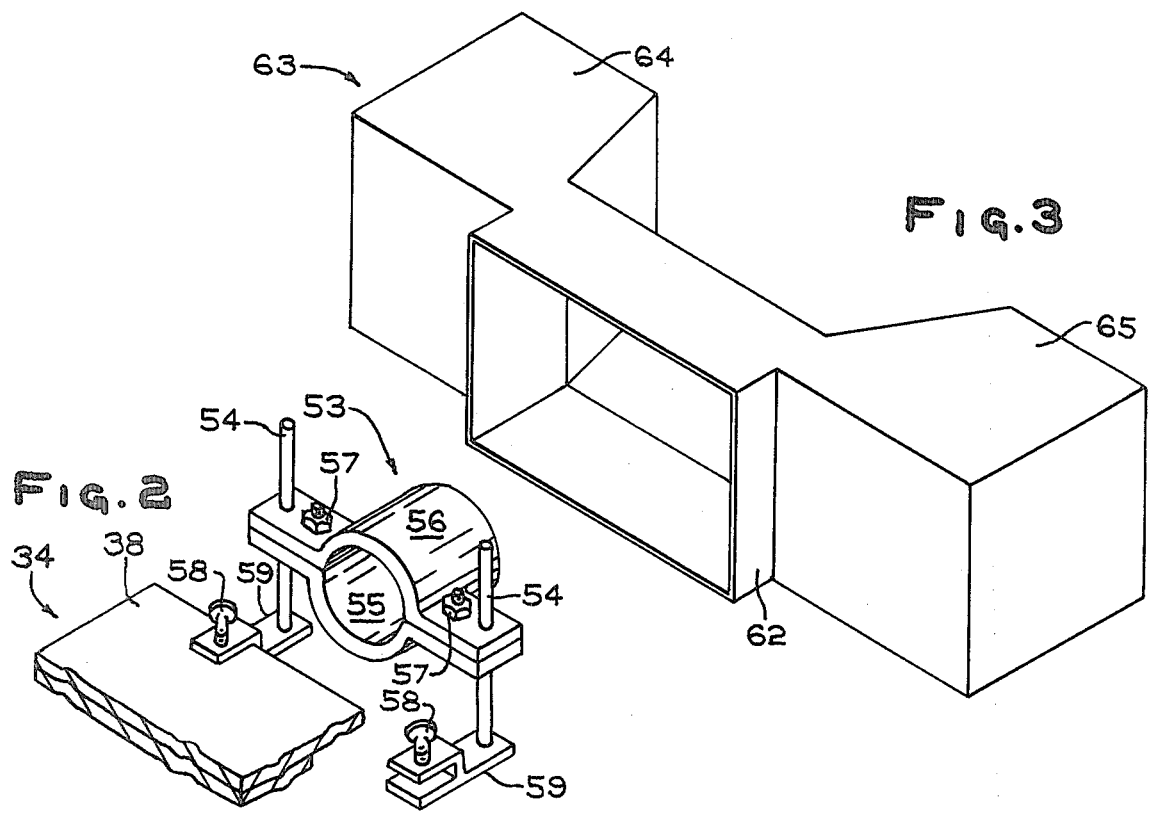

EDGE STRETCHING APPARATUS INCLUDING INSULATED SEAL

BACKGROUND OF THE INVENTION

This invention relates to apparatus for applying forces to glass being formed into a continuous sheet of glass while floating on molten metal. The invention relates more particularly to apparatus for sealing between an edge control machine barrel and a forming chamber wall.

DESCRIPTION OF THE PRIOR ART

The following U.S. patents describe devices and methods of sealing between a sidewall of a glass forming chamber and the devices which are placed through the side wall.

U.S. Pat. No. 3,805,072 to Goerens et al discloses a bellows tube which is utilized to seal thereon a device for determining the location of the edge of the glass.

U.S. Pat. No. 3,649,237 to Classen et al discloses a bellows type flexible material of metal or coated asbestos cloth utilized to seal around a cooling element.

U.S. Pat. No. 3,266,880 to Pilkington discloses a bellows type device utilized to seal around a cooling device.

In the use of edge control machines it is known to attempt to provide sealing between the forming chamber wall and the opening for the machine while still allowing barrel movement by stuffing the opening around the barrel of the edge control machine with refractory fibers. The difficulty with the utilization of such fibers is that when the machine is moved the fibers tend to become displaced or to not move with the machine as it is angled so that openings occur as the machine is moved. A further difficulty is that the fiberous material will fall out of the hole as the barrel of the edge control machine is urged further into the forming chamber. The material falling out of the hole can fall onto the tin and causes glass defects or jam ups when it is caught in the moving ribbon. In addition the material is not effective to control forming chamber atmosphere.

It has also been proposed to utilize the stainless steel bellows such as proposed in the above Pilkington patent for sealing around an edge control machine.

The use of bellows type seals for edge control machines has not been successful. The edge control machine as contrasted to devices for controlling coolers and edge sensors must be able to move up, down, in, out, left and right. These movements are necessary to control the depth of the edge control device into the glass, the amount of nip on the glass ribbon and the angle of the edge control wheel with respect to direction of glass movement which may be adjusted either to widen the ribbon to thin the glass or to narrow it to increase from equilibrium thickness. These movements do not have to be performed by coolers or edge sensors which merely move in and out. The bellows type devices when utilized to seal around edge control machine barrels have not proved successful as they tend to jam when the barrel of the edge control machine is inserted farther in the forming chamber after a previous adjustment has put a torque onto the device. The bellows device then is strained and usually at some point frees itself with enough force to vibrate the machine and affect the glass. Further, a problem with the stainless bellows is in the large sizes required for the openings for edge control machines they are not very flexible and are expensive.

There remains a need for seals between the sidewalls of the furnace and an edge control machine as there is a loss of heat and atmosphere gases through these holes leading to wasted energy and to uneven temperatures in the chamber. It is also possible for some oxygen to enter the chamber through such an opening, with undesired effects. A difficulty with the utilization of only cloth seals between the chamber sidewalls and the edge control barrel is that the cloth would tend to reverse itself as the barrel is inserted in the chamber and would not allow free movement of the edge control machine in the collar holding the cloth bellows around the edge control machine. Further, cloth does not provide gas or heat sealing. Therefore, it can be seen that there remains a need for an effective seal between the barrel of the edge control machine and the forming chamber sidewall.

SUMMARY OF THE INVENTION

It is an object of this invention to overcome the disadvantages of the prior art.

It is a further object of this invention to prevent heat loss from the forming chamber.

It is again an object of this invention to prevent contamination of the float chamber atmosphere.

It is an additional object of this invention to provide a collar for an edge control machine barrel that does not bind on the barrel.

It is a further object of this invention to provide an edge seal that does not bind as the edge control machine barrel is moved in and out of the furnace.

It is another object of this invention to provide a seal that does not bind as the barrel is angled upstream and downstream.

It is a further object of this invention to produce higher quality glass.

It is another object to provide a seal that does not bind as the edge control machine barrel is moved up and down.

These and other objects of the invention are accomplished by providing an insulated seal between the barrel of an edge control machine and a side wall of a forming chamber. The seal of the invention is provided with a collar that is attached to the edge control machine to remain in alignment with the barrel of the machine regardless of how the barrel is moved without transmitting torsional force to the barrel.

In a preferred embodiment the sleeve of the seal is formed of a insulating ceramic fiber batting that is provided on the inner surface with a woven ceramic refractory fiber sheet. On the outer surface is a woven ceramic refractory fiber having a coating which serves as a gas sealant. The coating for the exterior surface may be a silicone or metallic coating. It is further preferred to locate the collar to which the seal is fastened, said collar being around the control machine barrel, directly above the pivot point for the edge control machine.

BRIEF DESCRIPTION OF THE DRAWINGS

FIG. 1 is a perspective fragmentary view of the sealing device of the invention showing its relationship to the furnace opening, barrel of the edge control machine, and the edge control machine.

FIG. 2 illustrates the collar for the edge control machine barrel and the method of attaching the collar to the edge control machine.

FIG. 3 illustrates the side seal frame member forming the opening in the side wall of the forming chamber.

SUMMARY OF THE INVENTION

Figure 4:
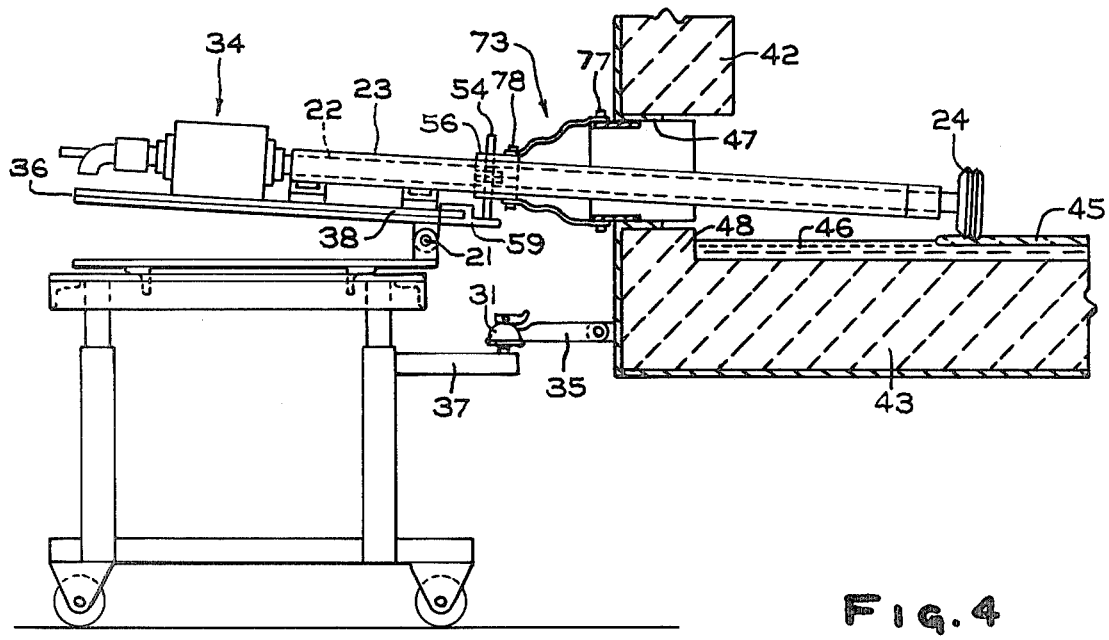
FIG. 4 is a cross-section showing the relationship of the edge control machine, the seal of the invention and the furnace.

An apparatus is provided for making flat glass comprising a chamber containing a pool of molten metal upon which the glass is supported while being formed into a continuous sheet of glass. The apparatus includes devices for engaging a marginal portion of the body of glass floating on the molten metal to prevent the glass from flowing to its equilibrium thickness. These devices may be used to maintain the thickness and width of the body of glass as desired by production needs. The thickness of the glass may be maintained at a thickness either greater than equilibrium thickness or less than equilibrium thickness. The chamber containing the pool of molten metal normally has the atmosphere therein controlled to be primarily nitrogen and containing a small amount of hydrogen. This exclusion of oxygen minimizes oxidation of molten tin which is utilized in the bath. One advantage of the instant invention is that it prevents escape of the atmosphere or contamination of the atmosphere by oxygen from the outside.

The edge control device utilizing the seal of the instant invention may be either suspended from overhead by means of a rail system, such as described in U.S. Pat. No. 3,929,444 or may be supported by edge control machines which are wheeled supports on the floor beside the forming chamber. The preferred barrel type for the edge control machine of the instant invention is the tubular barrel such as described in U.S. Pat. No. 3,709,673 to Bishop. This barrel is preferred as the exterior of the barrel does not rotate and therefore does not tend to exert twisting forces on the seal.

Mounted on the end of the barrel of the edge control member is the glass engaging member. The glass engaging member may be a top edge roll such as disclosed in U.S. Pat. No. 3,929,444 or may be a bottom edge roll as disclosed in U.S. Pat. No. 3,533,772 to Itakura et al.

The invention will now be further described with reference to the accompanying drawings. In FIGS. 1, 2 and 3 the device of the invention is illustrated with several main elements identified as the edge control machine 34, the collar 53, the flexible sleeve material 73 and the flange member for insertion in a furnace sidewall 63. The relationship of these elements will be apparent as described below.

The collar 53 as illustrated comprises two portions upper portion 56 and lower portion 55. These parts are bolted together by bolts 57. The collar is arranged to be slideably mounted on pins 54 such that it can freely move up and down. The pins 54 are rigidly mounted to a plate 38 of edge control machine 34. The bracket bolting the pin supports for the collar to the edge control machine comprises clamp 59 with bolts 58 that hold the pins to align the collar with the shaft 23. The flexible sleeve member 73 of a construction which will be discussed below is held to collar 53 by clamp 78. Clamp 78 may be any suitable means for holding a flexible sheet to a collar such as flexible metal clamps such as hose clamps. The other end of a flexible member is held to the flange 62 by suitable holding means such as a metal band or hose clamp. Side seal frame 63 provides an opening for the insertion of the edge control device and a flange to which the flexible member may be clamped. The opening member comprises portion 64 and 65 which extend into the furnace and prevent deterioration of plates 47 and 48 which are part of the frame of the furnace. These parts extending in the furnace are angled to allow for the barrel of the edge control machine to be swept at least 20 degrees downstream and 15 degrees in the upstream direction. The side seal frame opening block 63 is generally formed of a steel material, portions 64 and 65 are formed of stainless steel filled with a ceramic fiber to provide insulation. The portions 65 and 64 cover and provide some cooling to plates 47 and 48.

With reference to FIG. 4 there is illustrated an edge control machine and its relationship to the forming chamber. Not shown on the edge control machine as illustrated are the drive means for racking the barrel in and out on bearing surface 36 or devices for angling the barrel up and down from pivot point 21. The carriage further is able to be driven (means not shown) to angle the barrel 23 upstream or downstream. However, as shown the edge control machine preferably is fastened to the furnace such that the pivot point remains fixed by the pivot point of the fastener holding the machine to the chamber. As illustrated there is ball connection 31 between arm 37 of the edge control machine 34 and the arm 35 from the forming chamber basin 43. In FIG. 4 the wheel of the edge control machine is identified as 24, the glass 45 and the tin is 46. The wheel 24 is driven by shaft 22 in the stationary barrel 23. The upper portion of the chamber is identified as 42. While the preferred form of the invention is to have the collar located directly above the pivot point, it is possible for the seal of the invention to operate with the collar rigidly located at any point along the barrel 23. However, location of the collar at another point necessitates a greater amount of the flexible material joining the collar and the furnace flange as a greater range of movement of the seal is necessary.

The directions upstream and downstream are defined by the direction glass flows through the process; that is, glass flows from an upstream portion of the glass making apparatus toward a downstream portion of the apparatus. While, the applicant recognizes that the term bath has been used in the art to refer to both the molten metal material on which the glass is formed and to the chamber which holds the molten metal, the applicant in this specification intends to refer to the chamber holding the bath as the forming chamber or float forming chamber and only use the term bath to describe the molten metal itself. Other terms that may be used in the specification are "nip" which refers to the distance from the edge of the glass ribbon transversely towards the middle of the glass ribbon that the edge control wheel is placed. The term "bite" is used to mean the depth into the ribbon that the edge control wheel is placed. The term ribbon and sheet are used interchangeably to refer to the molten glass in the forming chamber. The edge control device is moved in and out of the chamber to control nip. The edge control device is moved up and down to control bite and may be moved farther up for withdrawal from the chamber when not is use.

Figure 5:
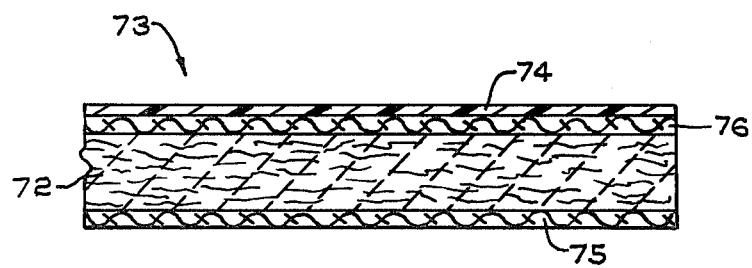
FIG. 5 is a cross-sectional view of preferred material for the seal of the invention.

Referring to FIG. 5 there is illustrated generally the flexible material 73 which forms the sleeve portion of the seal between the flange on the side seal frame of the forming chamber and the collar on the barrel of the edge control machine. The sleeve material comprises in the preferred form an inner portion 75 comprising a woven cloth of heat resistant fiber. Preferred is a silica type cloth such as "Refrasil" silica cloth from the materials division of Hitco Division of Armco Steel. Other suitable types of heat resistant cloth may be used for the innerlayer including asbestos cloth and high alumina cloth. The middle layer in the preferred flexible member is an insulating mineral fiber such as those made from kaolin containing alumina-silica. Such fiber batts are available from Babcock Wilcox under the name Kaowool. A preferred surface member 76 has a impervious coating 74 to act as a gas seal. The surface member does not need to be exceedingly heat resistant as the temperatures are less than 300° F. A preferred member has been found to be a silica woven cloth coated with a silicone rubber coating. Other high temperature resins also may be used to render the silica cloth impervious. Typical of such resins are polyamides and fluorine substituted aliphatic resins.

While the preferred middle insulating layer of the seal has been described as a mineral fiber such as alumina silica padding any insulating high temperature material could be utilized. Among suitable materials would be layers of refractory cloth and insulating particulate material that had been held in place by quilting.

Any suitable surface material may be utilized. A refractory cloth of asbestos treated with a metallic coating or with silicone may be suitable. However, the preferred material is a silica cloth with a silicone coating as this retains flexibility at high temperatures, and does not run any risk of metal contamination of the bath or glass.

As can be seen from the drawings the seal of the invention allows movement in all directions while the pins extending from the rigid connection with the edge control machine frame maintain the collar alignment with the barrel of the edge control machine so that no binding takes place as the barrel is moved toward and back through the collar.

While the side seal frame has been described as being formed of steel it is of course possible that the frame could be formed of other high temperature metal or refractories. Although the seal of the invention has been found to be particularly suitable for edge control machines due to their wide range of movement, it is suitable for other uses such as movable coolers, fences, edge detection devices and temperature sensors. Further the collar and seal of the invention is suitable for use in other heating chambers where the atmosphere may be controlled such as a tempering lehr.

Although this invention has been described with reference to particularly preferred embodiments, those skilled in the art of glass making will recognize that various modifications may be made in the practice of this invention without departing from the concepts disclosed here. For instance, the collar could be arranged to accept the shaft of any other device mounted with the edge control device such as an edge sensing device, that is integral with the edge control machine or multi-barrel edge control devices. Further other shapes for the side seal frame and collar could be utilized without departing from the spirit of the invention. The frame could have a circular or oval opening. Accordingly this disclosure is intended to be illustrative rather than limiting. The applicants have defined their invention in the claims accompanying this disclosure.

We claim:

1. Apparatus for sealing between edge control machines and forming chamber sidewalls comprising support means, collar means mounted to said support means and slidably surrounding the barrel of said edge control machine, means mounted between said edge control machine and said collar for maintaining movement of said collar in a vertical plane relative to said support means in order that it does not bind during movement of said barrel of said edge control machine, and a flexible sleeve fastened to said collar and to said forming chamber sidewall.

2. The apparatus of claim 1 wherein said means mounted between said edge control machine and said collar comprises vertical pins in sliding contact with said collar.

3. The apparatus of claim 1 wherein said flexible sleeve comprises woven ceramic fiber cloth coated with an impervious coating.

4. The apparatus of claim 3 or 1 wherein said flexible sleeve comprises an insulating layer.

5. The apparatus of claim 1 wherein said sleeve is substantially impervious.

6. The apparatus of claim 1 wherein said sleeve comprises an inner layer of ceramic fiber cloth a middle layer of ceramic fiber batting and an outer layer of ceramic fiber coated with a high temperature resistant flexible resin.

7. The apparatus of claim 1 further comprising a side seal frame member having a flange for fastening said sleeve.

8. The apparatus of claim 7 wherein the portions of said frame member extending into said chamber comprise stainless steel filled with insulating fibers.

9. The apparatus of claim 1 wherein said sleeve comprises an inner layer of woven ceramic fiber cloth, a middle layer of insulating material comprising ceramic fiber batting and a surface layer of ceramic fiber cloth having its outer surface coated with a gas impervious coating selected from the group consisting of metals and high temperature resistant flexible resins.

10. The sleeve of claim 9 wherein said coating is a silicone rubber.

11. In an apparatus for making flat glass wherein the position of a marginal portion of a body of glass supported on a pool of molten metal in a chamber is controlled to establish and maintain a desired width and thickness of the glass, the combination comprising:
    (a) structural support means mounted outside said chamber,
    (b) a carriage, including a carriage frame, adjustable mounting means and a mounting platform on said structural support
    (c) an elongated member mounted on said mounting means and being extendable through a side wall and over the pool of molten metal
    (d) means for engaging glass supported on said molten metal mounted on said elongated member and providing means for applying a force to the glass wherein said elongated member is capable by means of a carriage movement and adjustable mounting movement of moving said means for engaging the glass in directions upward, downward, upstream, downstream, into said chamber and out of said chamber;
    (e) collar means slidably surrounding said elongated member, means between said mounting platform and said collar for maintaining movement of said collar in a plane vertically aligned with said elongated member and a flexible sleeve fastened to said collar and to said chamber sidewall.

12. The apparatus of claim 11 wherein said sleeve is insulating.

13. The apparatus of claim 11 or 12 wherein said sleeve is gas impervious.

14. The apparatus of claim 11 wherein the surface of said elongated member does not rotate at the area where it is sliding contact with said collar.

15. The apparatus of claim 11 wherein the surface of said elongated member surrounded by said collar is rotating.

16. The apparatus of claim 11 wherein said means between said mounting platform and said collar comprises vertical pins in sliding contact with said collar.

* * * * *